United States Patent [19]

Leu

[11] Patent Number: 5,020,398

[45] Date of Patent: Jun. 4, 1991

[54] HOLLOW ENDED FOUR-WAY SOCKET WRENCH

[76] Inventor: James M. Leu, 159 Thornhurst, Bolingbrook, Ill. 60439

[21] Appl. No.: 618,811

[22] Filed: Nov. 27, 1990

Related U.S. Application Data

[63] Continuation of Ser. No. 467,352, Jan. 23, 1990, abandoned, which is a continuation of Ser. No. 317,579, Mar. 1, 1989, abandoned.

[51] Int. Cl.$^5$ ............................................. B25B 13/00
[52] U.S. Cl. .................................. 81/124.4; 81/124.6; 81/177.2
[58] Field of Search ............... 81/124.46, 124.5, 124.6, 81/177.2

[56] References Cited

U.S. PATENT DOCUMENTS

| | | | |
|---|---|---|---|
| 1,517,878 | 8/1922 | Houston | 81/124.4 |
| 2,341,375 | 2/1944 | Hambleton | 81/124.4 |
| 2,644,359 | 7/1953 | Lydle | 81/124.4 |

FOREIGN PATENT DOCUMENTS

| | | | |
|---|---|---|---|
| 2305770 | 8/1974 | Fed. Rep. of Germany | 81/124.4 |
| 0567117 | 1/1945 | United Kingdom | 81/124.4 |

Primary Examiner—Frederick R. Schmidt
Assistant Examiner—Lawrence Cruz

[57] ABSTRACT

An improved four-way socket wrench includes elongated socket members having a lower tubular portion connected between a socket head portion and a cross bar member, the lower tubular portion having an axial bore therein that is in communication with the socket opening of the socket member. Rigid implements can be inserted into the socket member so as to impart increased leverage thereto so as to, in turn, impart increased rotational torques to a nut being tightened or loosened.

6 Claims, 1 Drawing Sheet

U.S. Patent
June 4, 1991
5,020,398
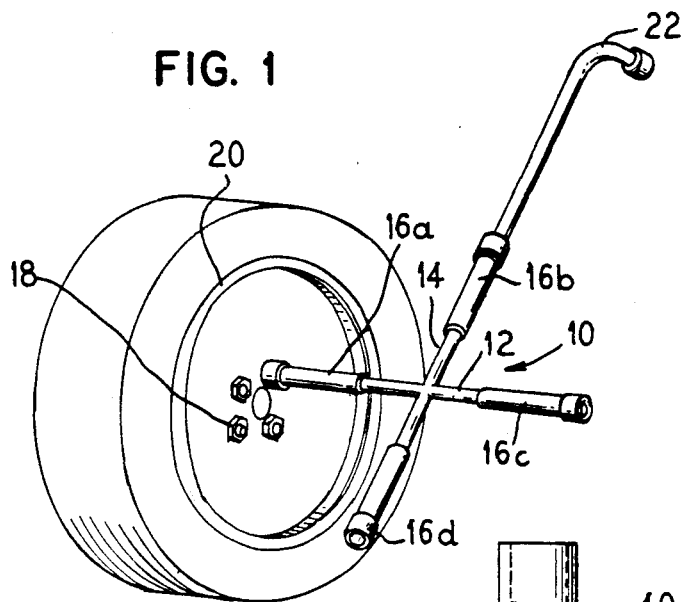
FIG. 1
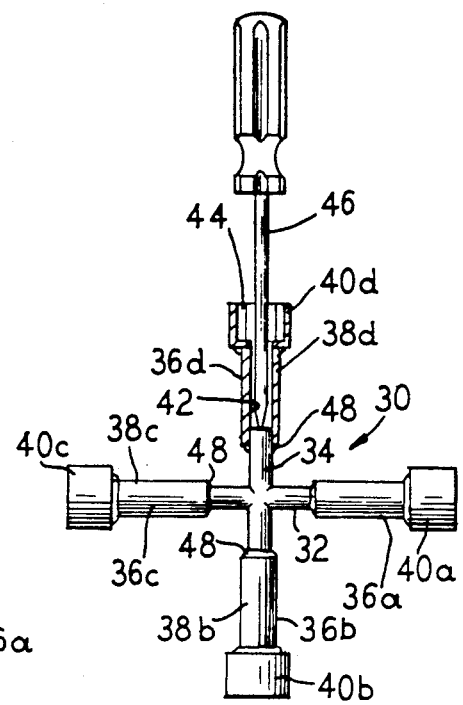
FIG. 2
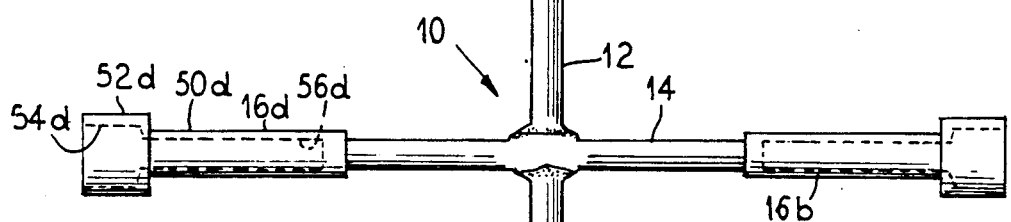
FIG. 3
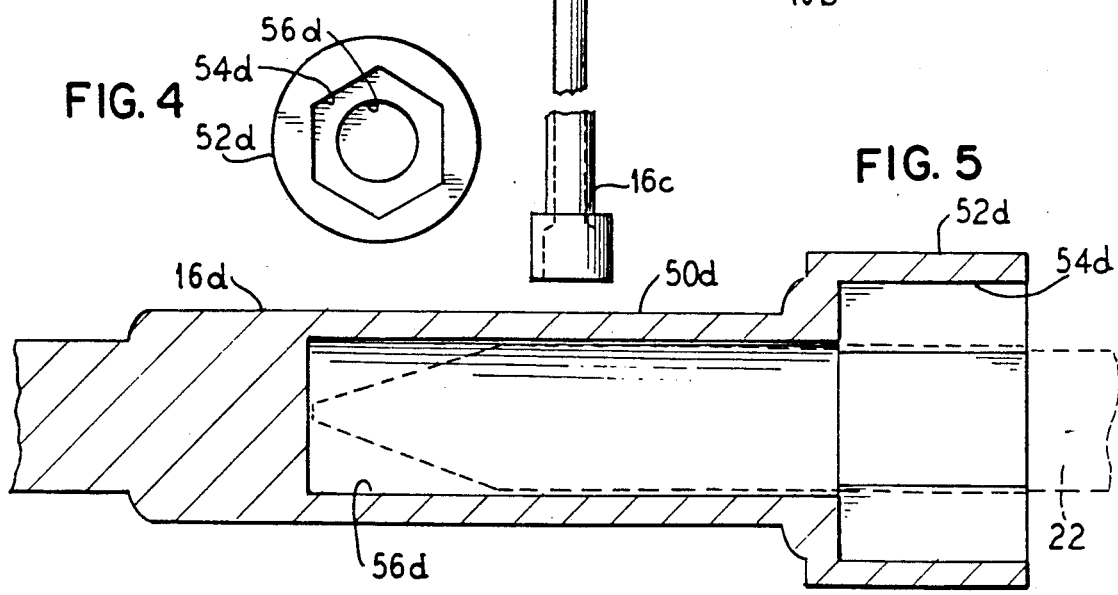
FIG. 4
FIG. 5

HOLLOW ENDED FOUR-WAY SOCKET WRENCH

This is a continuation, of application Ser. No. 467,352, filed Jan. 23, 1990, now abandoned which is a continuation, of application Ser. No. 317,579, filed Mar. 1, 1989, now abandoned.

BACKGROUND OF THE INVENTION

The invention generally relates to socket wrenches. More particularly, the invention relates to a four-way socket wrench having four socket heads positioned at ends of two crossing rods, for use, for example, as an automobile tire wrench.

Most automobile manufacturers supply lug or socket wrenches to be employed by a purchaser of the automobile to loosen and tighten lug nuts on the wheels of the automobile for changing of tires. The torque required to loosen the lug nuts is sometimes too much for many people to generate with the lug wrench supplied by the auto manufacturers. Accordingly, several lug wrench designs have been generated in the automotive aftermarket.

The usual lug wrench design of those wrenches supplied by automobile manufacturers includes a modified L-shaped wrench with a flattened end and a socket end. An example of such a wrench is illustrated as tool member 22 in FIG. 1. The flattened end is design to remove wheel covers and hub caps, while the socket end is made to fit the specific size of the lug nuts on the wheels of a given vehicle. Such a wrench is usually applied by holding the socket end of the wrench on the lug nut with one hand and applying pressure on the flattened end with the other hand. It is not uncommon for users to be unable to remove extremely tight lug nuts with that tool inasmuch as the tool is somewhat awkward to use as the torque exerted by the user is too great to overcome the pressure needed to maintain the socket end over the lug nut.

In response to this problem, in the automotive aftermarket, a popular lug wrench design has evolved that includes a four-way wrench. The wrench comprises a cross of two rod bars at the four ends of which are included sockets of varying sizes. The four-way lug wrench has at least two advantages over the L-shaped wrench described above. First, the four-way wrench enables the user to apply an even force on the wrench with two hands. Second, at least four different socket sizes are available on the wrench and, accordingly, the wrench can be applied to at least four different sizes of lug nuts.

Occasionally, it is desirable to apply a greater torque to a four-way wrench than is possible solely by employing the four-way wrench. To this end, the usual method is to employ a pipe or tube to exert a greater leverage on a cross bar member that is perpendicular to the socket located on a lug. The pipe has an interior diameter greater than that of the bar and socket of the four-way wrench to which the leverage is to be applied. The tube or pipe is placed about the bar to which the leverage is to be applied such that the bar and socket thereof are inserted into the tube or pipe. Following this, the leverage is applied to an end of the tube or pipe so as to impart a greater rotational torque to the lug nut socket.

Invariably, such tubes or pipes are not available to someone stranded by the roadside with a flat tire. Additionally, such tubes or pipes may not even be readily available to a person desiring to use the wrench at home. Yet further, to carry such a tube or pipe in the trunk of a car could impose a burden as the tube or pipe occupies more space than just the four-way wrench alone and can be of a heavy weight.

SUMMARY OF THE INVENTION

The present invention provides an improved four-way lug wrench that allows for the application of leverage by means of a second member. To this end, in accordance with principles of the invention, the present invention provides a four-way lug wrench wherein the socket ends include elongated hollow members so that a rigid tool member such as a screwdriver or small rod can be inserted into the socket and then employed to provide increased torque to the four-way wrench.

BRIEF DESCRIPTION OF THE DRAWINGS

In the drawings:

FIG. 1 is a perspective view of a wrench embodying principles of the invention illustrating the employment of the wrench to remove lug nuts from an automobile wheel;

FIG. 2 is a partial cross-sectional view of a small four-way socket wrench employing principles of the invention;

FIG. 3 is a lateral view of a larger four-way socket wrench embodying principles of the invention;

FIG. 4 is an end view of a socket end of a four-way socket wrench embodying principles of the invention; and FIG. 5 is a fragmentary cross-sectional view of a socket end of a four-way socket embodying principles of the invention.

DETAILED DESCRIPTION OF THE PRESENTLY PREFERRED EMBODIMENTS

In FIG. 1 there is illustrated a four-way socket or lug wrench 10 embodying principles of the invention. As illustrated, the wrench 10 includes two bars, rods, or pipes 12 and 14 that are joined together so as to form a cross or X-shape. Accordingly, the bars 12 and 14 preferably are joined together at mid-sections thereof, and are oriented so as to be perpendicular to each other. This shape provides symmetry in leverage application. However, it is not essential that the bars 12 and 14 be joined together so as to be symmetrical about the connecting point, and those skilled in the relevant art can appreciate various other configurations that can be employed.

As further illustrated, the wrench 10 includes four socket members 16a–16d, each of which is located at one end of the cross arms 12 and 14. The socket ends 16a–16d are employed for loosening and tightening lug nuts 18 for removing and securing, respectively, a wheel 20 from and to, respectively, an axle (not illustrated). The illustrated wrench 10 is generally employed in the same manner as those of the prior art. That is to say, the wrench 10 is employed such that the socket head of one of the socket members, such as the socket member 16a is located about a lug nut 20 and then the wrench 10 is oriented so as to be substantially aligned with an axis of a bolt on which the lug nut is located. Thereafter, the wrench 10 is caused to rotate about the axis defined by the cross member 12 on which the socket member 16a is located. This is accomplished by grasping the ends of the cross member 14 which is oriented perpendicularly to the cross member 12 and then exerting appropriate leverage forces thereon.

Most importantly, however, the wrench 10 is designed so as to permit, as illustrated, the insertion of a rigid tool member 22 into any of the socket members 16a–16d. The ability to insert a tool member 22 into one of the socket members 16a–16d permits one to exert greater leverage on the socket member into which the tool 22 is inserted and thus, stronger rotational torque forces on the lug nut via the socket heads, for example, the socket head of socket member 16a, located thereabout. It can be appreciated that in FIG. 1, the illustrated tool member 22 comprises a typical lug wrench supplied by an automobile manufacturer.

In FIG. 2 there is illustrated a four-way lug or socket wrench 30 embodying further principles of the invention. As illustrated, the wrench 30 is similar to the wrench 10 but has cross arms 32 and 34 that are shorter than the cross arms 12 and 14. Accordingly, the wrench 30 is designed so as to be employed in conjunction with portable tool sets.

At axial ends of the cross members 32 and 34, there are appropriately located or attached socket members 36a–36d. The socket members each include a lower tubular or hollow member 38a38d, respectively, and an upper socket head 40a–40d, respectively. The socket members 36a–36d are attached to the cross members 32 and 34 by inserting the cross arms partially into the hollow members and then welding at 48.

As illustrated most clearly in connection with the socket member 36d, each socket member includes an inner bore 42 within its respective lower tubular member. Each socket head includes an inner surface 44 that is appropriately formed so as to engage the outer surfaces of a lug nut.

It can be appreciated that, as illustrated, a rigid tool such as a screwdriver 46 can be inserted to any of the socket members 36a–36d and into the inner bore 42 thereof so that the tool member can be used to impart leverage or rotational torque to the wrench 30. To this end, placement of the screwdriver 46 within the socket member 36d will enable one to impart a rotational torque in either the socket member 36a or the socket member 36c.

In FIGS. 3–5, the wrench 10 is illustrated in greater detail. To this end, in FIGS. 3 and 5, the structure of the socket members can be seen. Socket member 16d is discussed further herein and is considered typical and illustrative of the remaining socket members.

In FIGS. 3–5, it can be seen that the socket member 16d includes a lower tubular member 50d and an upper socket head 53d. The lower tubular member 50d includes an axial bore 56d that is in communication at one end with opening 54d in the socket head 53d. Said bore having a depth of at least three times its diameter so that a rigid tool inserted therein will be held substantially in alignment with the bore's longitudinal axis. The opening 54d is appropriately formed so as conform to the shape of a particular size of a lug nut. Accordingly, it can be appreciated that a continuous opening is defined by the openings 54d and the bore 56d.

In FIG. 5, it is shown that the socket member 16d and the cross member 12 can be integrally formed by means of forging. However, the socket member 16d can be separately formed and joined to the cross member 12 by means of welding and the like such as illustrated in FIG. 2 in connection with the wrench 30.

Further in FIG. 5, the location of the end of the tool 22 within the continuous opening formed by the opening 54d and bore 56d, is illustrated. The tool 22 can be placed so as to extend fully into the bore 56d to provide maximum engagement between the tool 22 and the socket member 16d.

It can be appreciated that the presently described four-way lug or socket wrenches are an improvement over the prior art. It is readily appreciated that a user of the wrenches is more likely to have available a lug wrench 22 or a screwdriver 46 than a pipe or tube for exerting increased leverage on or imparting increased rotational torque with the illustrated socket wrenches.

While a preferred embodiment has been shown, modifications and changes may become apparent to those skilled in the art which shall fall within the spirit and scope of the invention. It is intended that such modifications and changes be covered by the attached claims.

I claim:

1. A four-way socket wrench comprising:
   (a) two cross bar members operatively joined together so as to form an x shape having four axial ends, each cross bar member having a longitudinal axis, said cross bar members being joined so that a force applied to one of said cross bar members imparts torque to the other of said cross bar members to cause same to rotate about its longitudinal axis;
   (b) a socket member located at each axial end of each cross bar member, said socket member including a socket head and a tubular member, said tubular member having rigidly connected between said socket head and said axial end of said cross bar member, said socket head including an opening adapted to conform to the shape of a lug nut, and tubular member having a bore therein in communication with said opening of said socket head so as to define a continuous opening in the socket head and said tubular member, said socket member adapted to receive therein a rigid member extending, in succession, through said opening in said socket head and said bore, said bore having a uniform diameter and being of a size and depth wherein the depth is at least three times the diameter of said bore so that when said rigid member is fully inserted in said bore, said rigid member is held substantially in alignment with said longitudinal axis and free of contact with said socket head thereby to extend the length of the cross bar member attached to the socket member in which said rigid member is received so as to increase the torque imparted to an adjacent orthogonal disposed socket head of said cross bar members.

2. The four-way socket wrench of claim 1, wherein each socket member is separately formed and includes a separate axial bore extending through its respective tubular member, each socket member being located on an end of a cross bar member and being permanently affixed thereto.

3. The four-way socket wrench of claim 1, wherein each socket member is integrally formed with its respective cross bar member.

4. The four-way socket wrench of claim 1, further including a rigid member positioned within one of the socket members.

5. The four-way socket wrench of claim 1, wherein the cross bar members are oriented perpendicularly to each other.

6. The four-way socket wrench of claim 1, wherein said cross bar members are of equal length.

* * * * *

UNITED STATES PATENT AND TRADEMARK OFFICE
CERTIFICATE OF CORRECTION

PATENT NO. : 5,020,398
DATED : June 4, 1991
INVENTOR(S) : James M. Leu

It is certified that error appears in the above—identified patent and that said Letters Patent is hereby corrected as shown below:

Column 3, line 50, "53d" should be --52d--.

Column 3, line 52, "53d" should be --52d--.

Column 4, line 29 (Claim 1), "having" should be --being--.

Column 4, line 32 (Claim 1), "and" should be --said--.

Signed and Sealed this

Fourteenth Day of December, 1993

*Attest:*

BRUCE LEHMAN

*Attesting Officer*     *Commissioner of Patents and Trademarks*